(12) United States Patent
Tomita

(10) Patent No.: US 8,825,236 B2
(45) Date of Patent: Sep. 2, 2014

(54) METHOD PROVIDING RELIABILITY DATA OF LONG-TERM PREDICTED ORBIT DATA OF POSITIONING SATELLITE, APPARATUS FOR PROVIDING SAME, AND COMPUTER PROGRAM FOR PROVIDING SAME

(75) Inventor: Kyoichi Tomita, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 983 days.

(21) Appl. No.: 12/577,005

(22) Filed: Oct. 9, 2009

(65) Prior Publication Data

US 2010/0103041 A1    Apr. 29, 2010

(30) Foreign Application Priority Data

Oct. 24, 2008   (JP) .................. 2008-274559

(51) Int. Cl.
*G01C 21/24* (2006.01)
*G06F 19/00* (2011.01)
*G01S 19/27* (2010.01)

(52) U.S. Cl.
CPC ..................... *G01S 19/27* (2013.01)
USPC .............. 701/13; 701/4; 701/531; 342/450; 342/357.45; 342/357.51; 342/357.58; 342/358; 342/385; 342/386; 244/158.4

(58) Field of Classification Search
USPC .......... 701/226, 4, 13, 531; 342/450, 357.03, 342/357.06, 357.14, 357.15, 357.45, 342/357.51, 357.58, 358, 385, 386; 244/158.4

See application file for complete search history.

(56) References Cited

U.S. PATENT DOCUMENTS

2002/0188403 A1 * 12/2002 LaMance et al. ............. 701/213
2005/0212700 A1    9/2005 Diggelen et al.
2007/0103364 A1 *  5/2007 Garin et al. ............. 342/357.15
2008/0024361 A1 *  1/2008 Diggelen et al. ......... 342/357.03

* cited by examiner

*Primary Examiner* — Adam Tissot
(74) *Attorney, Agent, or Firm* — Global IP Counselors, LLP

(57) ABSTRACT

A method of determining the reliability of long-term predicted orbit data, includes: determining the reliability of long-term predicted orbit data, which is acquired by predicting a satellite orbit in a target period of at least one day, using predicted position data including predicted positions of a positioning satellite in time series and actual position data including actual positions of the positioning satellite corresponding to the predicted positions.

8 Claims, 16 Drawing Sheets

METHOD PROVIDING RELIABILITY DATA OF LONG-TERM PREDICTED ORBIT DATA OF POSITIONING SATELLITE, APPARATUS FOR PROVIDING SAME, AND COMPUTER PROGRAM FOR PROVIDING SAME

The entire disclosure of Japanese Patent Application No. 2008-274559, filed Oct. 24, 2008 is expressly incorporated by reference herein.

BACKGROUND

1. Technical Field

The present invention relates to a method of determining the reliability of long-term predicted orbit data, a method of providing long-term predicted orbit data, and an information providing apparatus.

2. Related Art

A global positioning system (GPS) is widely known as a positioning system employing positioning signals and is used in positioning devices built in mobile phones and car navigation apparatuses. In the GPS, a positioning calculation of calculating a three-dimensional coordinate value indicating the position of a target apparatus and a clock error is carried out on the basis of information such as the positions of plural GPS satellites or the quasi-distance from the GPS satellites to the target apparatus.

In measuring the position using the GPS, satellite information such as the position, velocity, and direction of movement of the GPS satellite is first calculated on the basis of navigation data, such as almanac or ephemeris, which overlaps with a GPS satellite signal emitted from the GPS satellite. The almanac serves as an influential key to capturing a satellite but is not generally used in the positioning calculation, because the satellite information is of poor precision. On the other hand, the ephemeris serves as an influential key to capturing a satellite and can be also used in the positioning calculation, because the satellite information has excellent precision. Therefore, for example, when the positioning calculation is started without the ephemeris, the ephemeris should be acquired from the GPS satellite signal, thereby enhancing the TTFF (Time To First Fix).

Therefore, as a server and client system, a technique of allowing a server to predict long-term predicted ephemeris (long-term predicted orbit data), which is the ephemeris corresponding to a term of one week, and to provide the long-term predicted ephemeris to a positioning device as a component has been developed and disclosed, for example, in US-A-2002-188403 and US-A-2005-212700.

A method of defining the long-term predicted ephemeris in the same data format as a typical ephemeris can be considered as a method of defining the long-term predicted ephemeris. That is, a satellite orbit is approximated using Keppler's elliptical orbit model which is one of satellite orbit approximate models and the long-term predicted ephemeris is defined using values of parameters (hereinafter, referred to as "satellite orbit parameters") of the model expression. A predicted satellite calendar (predicted position data) including predicted positions acquired by predicting future positions of a positioning satellite at a predetermined time interval in time series is provided from a predetermined commercial system. The approximating calculation, using Keppler's elliptical orbit model, can be carried out using the predicted satellite calendar.

However, the predicted positions of the positioning satellite included in the predicted satellite calendar tend to be mismatched with the actual positions of the positioning satellite as it moves into the future. Accordingly, when the long-term predicted ephemeris is created by carrying out the approximating calculation using Keppler's elliptical orbit model, the satellite orbit calculated by the approximating calculation tends to be mismatched with the actual satellite orbit as it moves into the future from the creation time. In the past, since there was no technique of determining the reliability (whether it is suitable for positioning) of the created long-term predicted ephemeris after the long-term predicted ephemeris is once created, the positioning device having acquired the long-term predicted ephemeris from the server might carry out the positioning calculation using the long-term predicted ephemeris with low reliability.

SUMMARY

An advantage of some aspects of the invention is that it provides a technique of determining the reliability of a long-term predicted ephemeris.

According to an aspect of the invention, there is provided a method of determining the reliability of long-term predicted orbit data, including: determining the reliability of long-term predicted orbit data, which is acquired by predicting a satellite orbit in a target period of at least one day, using predicted position data including predicted positions of a positioning satellite in time series and actual position data including actual positions of the positioning satellite corresponding to the predicted positions in time series.

According to another aspect of the invention, there is provided an information providing apparatus including: a creation unit creating long-term predicted orbit data acquired by predicting a satellite orbit in a target period of at least one day; a determination unit determining the reliability of the long-term predicted orbit data using predicted position data including predicted positions of a positioning satellite in time series and actual position data including actual positions of the positioning satellite corresponding to the predicted positions in the time series; and a provision unit providing the long-term predicted orbit data and the determination result of the determination unit to a positioning device.

According to the above-mentioned configuration, the reliability of the long-term predicted orbit data, which is acquired by predicting a satellite orbit in a target period of at least one day, is determined using the predicted position data including predicted positions of a positioning satellite in time series and actual position data including actual positions of the positioning satellite corresponding to the predicted positions in time series.

The actual position of the positioning satellite is a position where the positioning satellite is actually located. Accordingly, when the difference between the predicted position and the actual position of the positioning satellite is great, it can be said that the accuracy of the predicted position is low and the reliability of the predicted satellite orbit predicted on the basis of the predicted position is low. Therefore, it is possible to properly determine the reliability of the long-term predicted orbit data using the predicted position data and the actual position data.

In the method of determining the reliability of long-term predicted orbit data, the long-term predicted orbit data may include data pieces which are acquired by predicting the satellite orbit in N predetermined periods into which the target period are divided, and the determination of the reliability of the long-term predicted orbit data may include determining the reliability of an M-th period data of the long-term predicted orbit data using the predicted position of the M-th period (where M=1, 2, . . . , and N) and the actual position corresponding to the predicted position, where the predicted positions included in the predicted position data are divided into time-series groups by periods having the same length as the predetermined periods.

According to this configuration, when the predicted positions included in the predicted position data are divided into time-series groups by periods having the same length as the predetermined periods, the reliability of the M-th period data of the long-term predicted orbit data is determined using the predicted position of the M-th period and the actual position corresponding to the predicted position. That is, the reliability of the long-term predicted orbit data is determined by correlating the periods to which the predicted positions belong with the periods of the data included in the long-term predicted orbit data by one-to-one.

In the method of determining the reliability of long-term predicted orbit data, the predicted position data may include a plurality of predicted position data pieces having different times when the prediction is carried out, and the determination of the reliability of the long-term predicted orbit data may include calculating a difference between the predicted position of the M-th period, included in the corresponding predicted position data piece, and the actual position corresponding to the predicted position for each of the plurality of predicted position data pieces, analyzing the difference between the predicted position and the actual position in the M-th period, and determining the reliability of the data in the M-th period of the long-term predicted orbit data using the analysis result.

According to this configuration, the difference between the predicted position of the M-th period included in the corresponding predicted position data piece and the actual position corresponding to the predicted position is calculated for each of the plurality of predicted position data pieces, and the difference between the predicted position and the actual position in the M-th period is analyzed. The reliability of the data in the M-th period of the long-term predicted orbit data is determined using the analysis result. The period having a great difference between the predicted position and the actual position can be determined to have long-term predicted orbit data of low reliability.

The method of determining the reliability of long-term predicted orbit data may further include calculating the difference between the predicted position and the actual position by a difference between a distance from a predetermined measured position to the predicted position and a distance from the measured position to the actual position.

According to this configuration, the difference between the predicted position and the actual position is calculated from a difference between a distance from a predetermined measured position to the predicted position and a distance from the measured position to the actual position. Accordingly, it is possible to determine the reliability of the long-term predicted orbit data by using the difference of the distance from the measured position instead of using the difference between the satellite positions.

The method of determining the reliability of the long-term predicted orbit data may further include calculating the difference between the predicted position and the actual position from a difference between a distance, which is obtained by adding a measured distance error corresponding to a predicted clock error of the positioning satellite at the predicted position to the distance from the measured position to the predicted position, and a distance, which is obtained by adding a measured distance error corresponding to an actual clock error of the positioning satellite at the actual position to the distance from the measured position, to the actual position.

According to this configuration, the difference between the predicted position and the actual position is calculated from a difference between a distance, which is obtained by adding a measured distance error corresponding to a predicted clock error of the positioning satellite at the predicted position to the distance from the measured position to the predicted position, and a distance, which is obtained by adding a measured distance error corresponding to an actual clock error of the positioning satellite at the actual position to the distance from the measured position, to the actual position. Accordingly, it is possible to determine the reliability of the long-term predicted orbit data by using the difference in the measured distance including the clock error of the positioning satellite.

The method of determining the reliability of long-term predicted orbit data may further include calculating as the measured position a middle position between a position obtained by projecting the predicted position onto the surface of the earth and a position obtained by projecting the actual position onto the surface of the earth.

According to this configuration, a middle position between a position obtained by projecting the predicted position onto the surface of the earth and a position obtained by projecting the actual position onto the surface of the earth is calculated as the measured position. Since the positioning satellite rotates around the earth and the elevation angle of the positioning satellite about a certain position varies, it is not suitable for the measured position to be fixed. For this reason, the measured position is determined using a so-called elevation projection.

According to still another aspect of the invention, there is provided a method of providing long-term predicted orbit data, including: creating long-term predicted orbit data; determining the reliability of the created long-term predicted orbit data using the above-mentioned method of determining the reliability of the long-term predicted orbit data; and providing the created long-term predicted orbit data and the determination result to a positioning device.

According to this configuration, the long-term predicted orbit data is first created. Then, the reliability of the created long-term predicted orbit data is determined using the above-mentioned method of determining the reliability of long-term predicted orbit data, and the created long-term predicted orbit data and the determination result are provided to the positioning device. Accordingly, the positioning device can be made not to use the data with a low reliability with reference to the reliability of the provided long-term predicted orbit data.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to the accompanying drawings. However, the invention is not limited to the exemplary embodiments.

Figure 1:
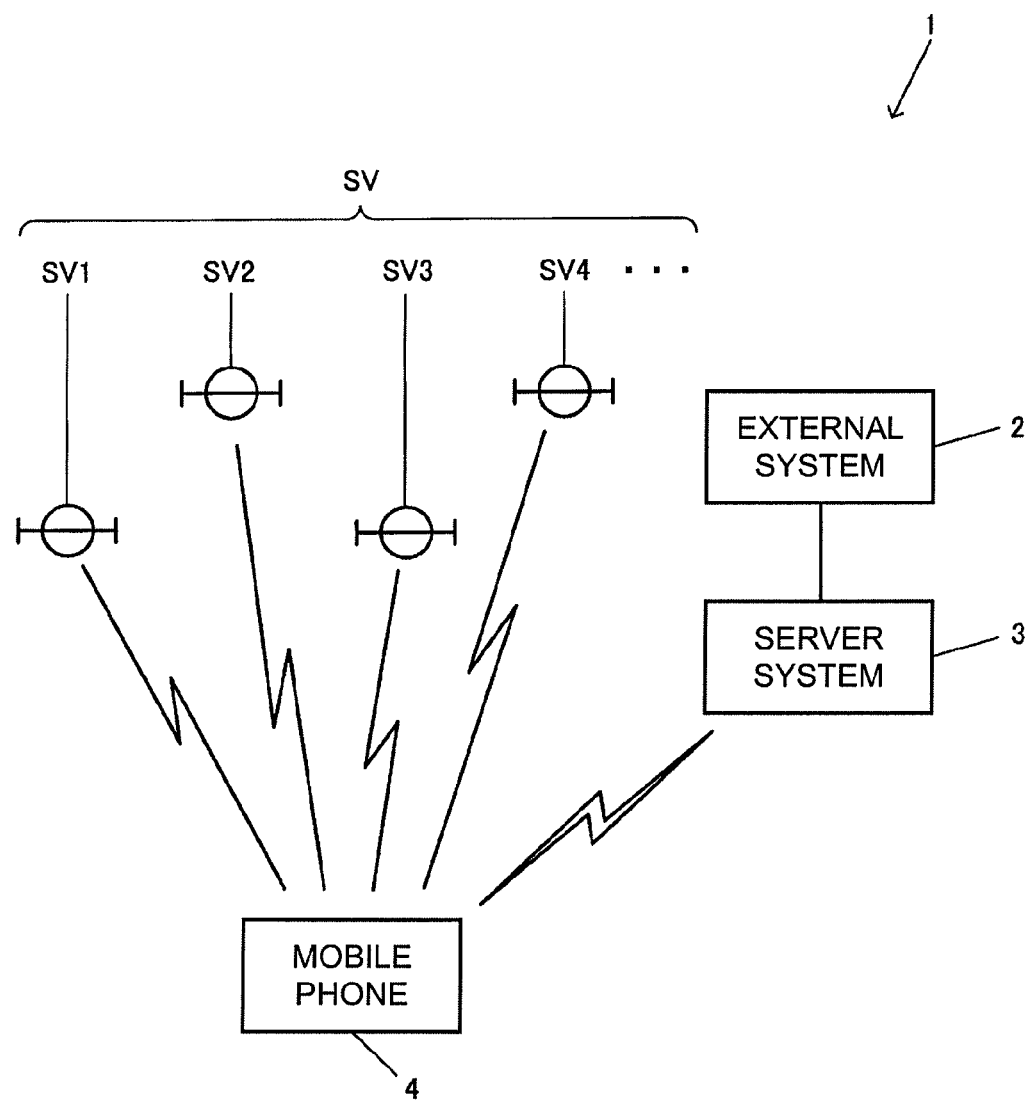
FIG. 1 is a diagram schematically illustrating the configuration of a positioning system.

FIG. 1 is a diagram schematically illustrating the configuration of a positioning system 1 common to the exemplary embodiments. The positioning system 1 includes an external system 2, a server system 3 which is a kind of information providing apparatus, a mobile phone 4 which is a kind of electronic apparatus having a positioning device, and plural GPS satellites SV (SV1, SV2, SV3, SV4, which are a kind of positioning satellite. The positioning calculation can be carried out using a mobile phone 4 and the GPS satellites SV, after the mobile phone 4 acquires the necessary data from the server system 3. Accordingly, the mobile phone 4 and the GPS satellites SV constitute one positioning system. The server system 3 and the mobile phone 4 can be called positioning system as an earth-side system.

The external system 2 is a known system for periodically receiving satellite signals from the GPS satellites SV, creating a predicted satellite calendar on the basis of navigation data included in the received satellite signals, and providing the created predicted satellite calendar to the server system 3. The predicted satellite calendar provided from the external system 2 is position data in which the predicted positions acquired by predicting the future positions of the GPS satellites SV and predicted clock errors acquired by predicting errors of atomic clocks built in the GPS satellites SV are arranged at a predetermined time interval (for example, an interval of 15 minutes) in time series.

The external system 2 also provides past data in addition to the predicted satellite calendars as future data. That is, the external system 2 creates a precise satellite calendar, which includes actual positions at which the GPS satellites SV are actually located and actual clock errors which are the actual errors of the atomic clocks built in the GPS satellites SV, as the past data and provides the created precise satellite calendar to the server system 3. Since the methods of calculating the actual positions and the actual clock errors are widely known, a detailed description will be omitted. For example, the external system 2 is a private or public computer system which provides predicted satellite calendars or precise satellite calendars.

The server system 3 is a system having a server acquiring the predicted satellite calendars and the precise satellite calendars from the external system 2 and creating and providing an ephemeris (hereinafter, referred to as "long-term predicted ephemeris" in this embodiment or "long-term predicted orbit data" because it is an orbit valid for a long term) valid for a long term of at least one day, for example, one week, as the predicted ephemeris of all the GPS satellites SV using the acquired predicted satellite calendars and the precise satellite calendars.

The mobile phone 4 is an electronic apparatus used for a user to communicate or to transmit and receive mail and has a positioning device performing a position measuring function (positioning function) in addition to the inherent functions of the mobile phone of communicating or transmitting and receiving mail. The mobile phone 4 transmits a request signal for the long-term predicted ephemeris to the server system 3 by the user's operation and receives the long-term predicted ephemeris from the server system 3. The mobile phone 4 captures the GPS satellites SV using the received long-term predicted ephemeris and carries out the positioning calculation based on the satellite signals.

1. First Embodiment 1-1. Principle

The server system 3 performs a process of creating the long-term predicted ephemeris using the predicted satellite calendar acquired from the external system 2. Specifically, the period from the creation time of the long-term predicted ephemeris to the time after one week is used as a creation period and the creation period is divided into plural periods (hereinafter, referred to as "prediction periods") when a satellite orbit is approximated and modeled. In this embodiment, the magnitudes of the prediction periods are uniformly 6 hours. That is, a creation period of one week is divided into 28 prediction periods (first prediction period to twenty-eighth prediction period) every 6 hours.

The server system 3 extracts the predicted position in each prediction period out of the predicted positions included in the predicted satellite calendar acquired from the external system 2. Keppler's satellite orbit model expression (hereinafter, also referred to as "approximate model") in which the square sum of distances from all the extracted predicted positions is the least is calculated on the respective prediction periods. The parameters of the calculated approximate model expression of the satellite orbit are referred to as the "satellite orbit parameters" and the calculation for the approximate model is also referred to as the "approximating calculation". The predicted satellite orbit acquired by the approximating calculation is referred to as "predicted orbit". The long-term predicted ephemeris is data including the values of the satellite orbit parameters in all the prediction periods for all the GPS satellites.

The predicted positions of the GPS satellites SV included in the predicted satellite calendar tend to be mismatched with the actual positions of the GPS satellites SV as they move into the future. Accordingly, when the long-term predicted ephemeris is created by carrying out the approximating calculation, the predicted orbit calculated by the approximating calculation tends to be mismatched with the actual satellite orbit as it goes into the future from the creation time.

In this embodiment, the server system 3 determines "predicted orbit reliability" which is an indicator value representing the reliability of the predicted orbit for each prediction period of each GPS satellite and provides the determined predicted orbit reliability as a reliability parameter to a mobile phone 4 along with the long-term predicted ephemeris. In this embodiment, the predicted orbit reliability is expressed by 13 steps of "0" to "12", where "0" represents the highest reliability of the predicted orbit and "12" represents the lowest reliability of the predicted orbit. The numerical range of the predicted orbit reliability can be properly changed and set and, for example, can be expressed by 16 steps of "0" to "15". The predicted orbit reliability is a value corresponding to "URA index" included in the ephemeris.

Figure 2:
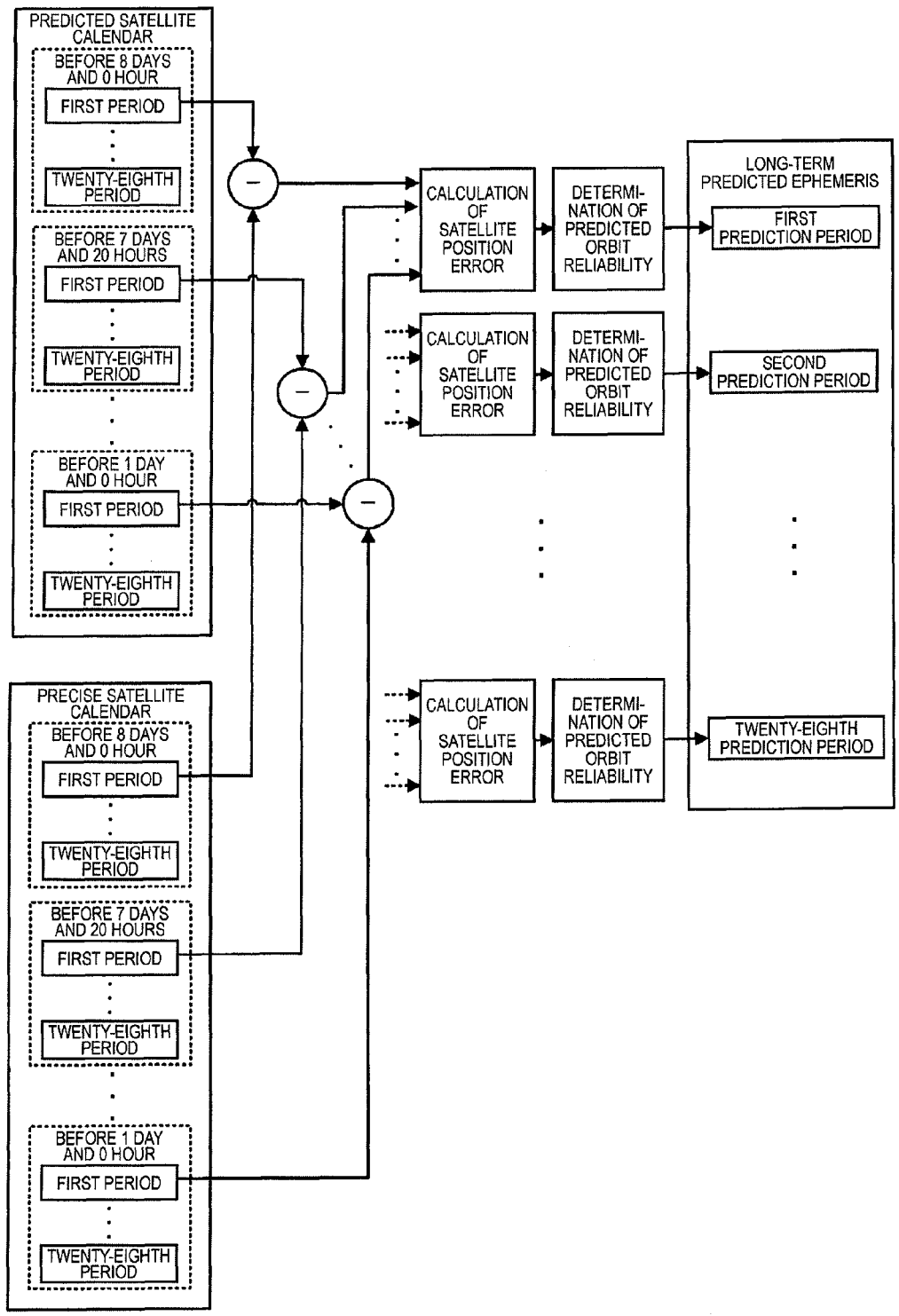
FIG. 2 is a diagram illustrating a method of determining the reliability of a predicted orbit.

FIG. 2 is a diagram illustrating the method of specifically determining the predicted orbit reliability. For the purpose of easy understanding, a flow of processes of creating data of the first prediction period in the long-term predicted ephemeris is mainly described. In this embodiment, the predicted orbit reliability included in the long-term predicted ephemeris is determined using combinations (hereinafter, referred to as "satellite calendar combinations") of plural predicted satellite calendars having different start times and precise satellite calendars (precise satellite calendars having the same start time) corresponding to the predicted satellite calendars. The start time means the time of the oldest satellite position out of the satellite positions included in each predicted satellite calendar and each precise satellite calendar.

In this embodiment, the predicted orbit reliability is determined using the predicted satellite calendars having start times different by four hours and the precise satellite calendars corresponding thereto. Each predicted satellite calendar and each precise satellite calendar include data of satellite positions and clock errors corresponding to one week and 28 periods acquired by dividing one week into groups of 6 hours are referred to as "a first period to a twenty-eighth period" for the purpose of convenience. However, actually, the predicted satellite calendar and the precise satellite calendar have a data structure in which the satellite positions and the clock errors are arranged and are not divided into period groups.

The predicted orbit reliability can be determined, for example, using a combination of satellite calendars of one week having different start times. Specifically, like a satellite calendar combination having a start time before 8 days and 0 hour from the present time, a satellite calendar combination having a start time before 7 days and 20 hours, a satellite calendar combination having a start time before 7 days and 16 hours, ..., and a satellite calendar combination having a start time before 1 day and 0 hour, satellite calendar combinations of one week having start times different by 4 hours are extracted.

In each satellite calendar combination, distances (hereinafter, referred to as "inter-satellite-position distance") between the predicted positions at the times (times with an interval of 15 minutes included in the predicted satellite calendar) included in the predicted satellite calendar and the actual positions at the times (times with an interval of 15 minutes included in the precise satellite calendar) included in the precise satellite calendar are calculated in the first to twenty-eighth periods. That is, the inter-satellite-position distance is calculated at the times in the first period, the second period, and the like, respectively.

A "satellite position error" is calculated using the inter-satellite-position distances calculated in all the satellite calendar combinations. The satellite position error can be calculated, for example, as an average of the inter-satellite-position distances calculated in all the satellite calendar combinations. The predicted orbit reliability is determined on the basis of the magnitude of the satellite position error. As the satellite position error becomes greater, the predicted orbit reliability becomes lower. Therefore, the predicted orbit reliability is determined to have a greater value as the satellite position error is greater (where the greater value of the predicted orbit reliability means the lower reliability).

Finally, the first period to the twenty-eighth period of each satellite calendar combination are correlated with the first prediction period to the twenty-eighth prediction period of the long-term predicted ephemeris. The predicted orbit reliability determined in each period is stored as the predicted orbit reliability in the corresponding prediction period in the long-term predicted ephemeris.

1-2. Functional Configuration

Figure 3:
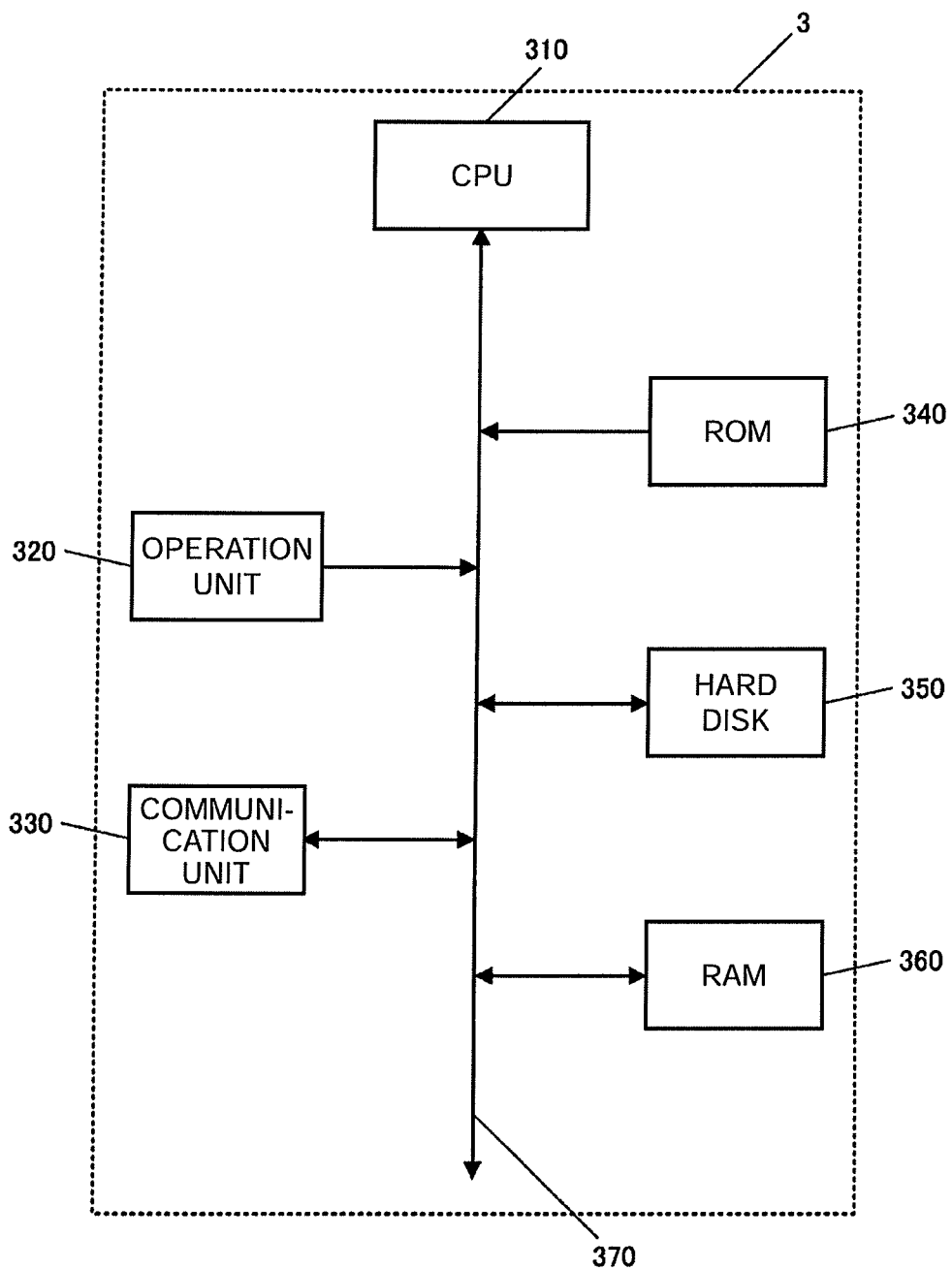
FIG. 3 is a block diagram illustrating the functional configuration of a server system.

FIG. 3 is a block diagram illustrating the functional configuration of the server system 3. The server system 3 is a computer system which includes a CPU (Central Processing Unit) 310, an operation unit 320, a communication unit 330, a ROM (Read Only Memory) 340, a hard disk 350, and a RAM (Random Access Memory) 360 and in which the units are connected to each other with an additional bus 370.

The CPU 310 is a processor generally controlling the units of the server system 3 in accordance with a system program stored in the ROM 340. In this embodiment, the CPU 310 performs a process of providing the long-term predicted ephemeris to the mobile phone 4 in accordance with a long-term predicted ephemeris providing program 341 stored in the ROM 340.

The operation unit 320 is an input device receiving an operation instruction from an administrator of the server system 3 and outputting a signal corresponding to the operation to the CPU 310. This function is embodied, for example, by a keyboard, buttons, a mouse, and the like.

The communication unit 330 is a communication device exchanging a variety of data used in the system with the external system 2 or the mobile phone 4 via a communication network such as the Internet.

The ROM 340 is a nonvolatile memory device dedicated to reading and stores various programs such as a system program for allowing the CPU 310 to control the server system 3, a program for providing the long-term predicted ephemeris to the mobile phone 4, and a program for creating the long-term predicted ephemeris and various data.

The hard disk 350 is a memory device which data can be read from and written to using a magnetic head, or the like, and which stores programs or data for performing various functions of the server system 3, similarly to the ROM 340.

The RAM 360 is a readable-writable volatile memory device and constitutes a work area temporarily storing various processing programs such as the system program and the long-term predicted ephemeris providing program executed by the CPU 310, data from the process of various processes, processing results, and the like.

1-3. Data Structure

Figure 4:
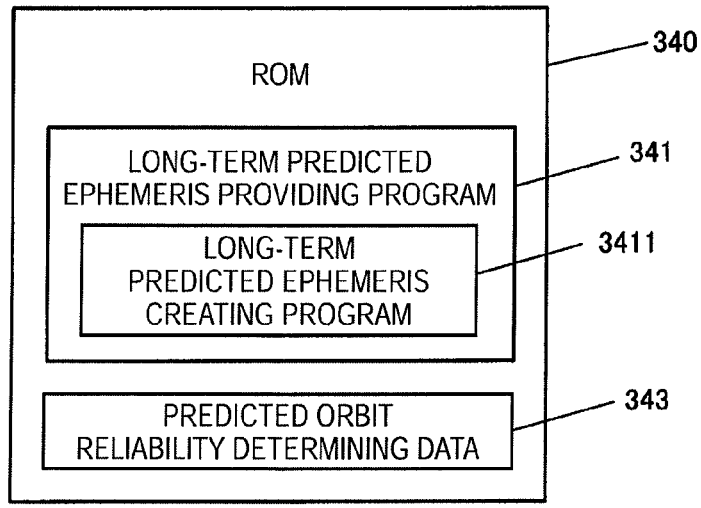
FIG. 4 is a diagram illustrating an example of data stored in a ROM of the server system.

FIG. 4 is a diagram illustrating an example of data stored in the ROM 340. The ROM 340 stores a long-term predicted ephemeris providing program 341 read and executed in a long-term predicted ephemeris providing process (see FIG. 12) by the CPU 310 and predicted orbit reliability determining data 343. The long-term predicted ephemeris providing program 341 includes a long-term predicted ephemeris creating program 3411 executed in a long-term predicted ephemeris creating process (see FIGS. 13 and 14) as a sub routine.

The long-term predicted ephemeris providing process is a process of allowing the CPU 310 to periodically create long-term predicted ephemeris data 357 and transmitting the created long-term predicted ephemeris data 357 to the mobile phone 4 as a request source when receiving a request signal for the long-term predicted ephemeris data 357 from the mobile phone 4. The long-term predicted ephemeris providing process will be described in detail later with reference to a flowchart.

The long-term predicted ephemeris creating process is a process of allowing the CPU 310 to create the long-term predicted ephemeris data 357. In this embodiment, the CPU 310 creates the long-term predicted ephemeris data 357 once every four hours. The long-term predicted ephemeris creating process will be also described in detail later with reference to a flowchart.

Figure 6:
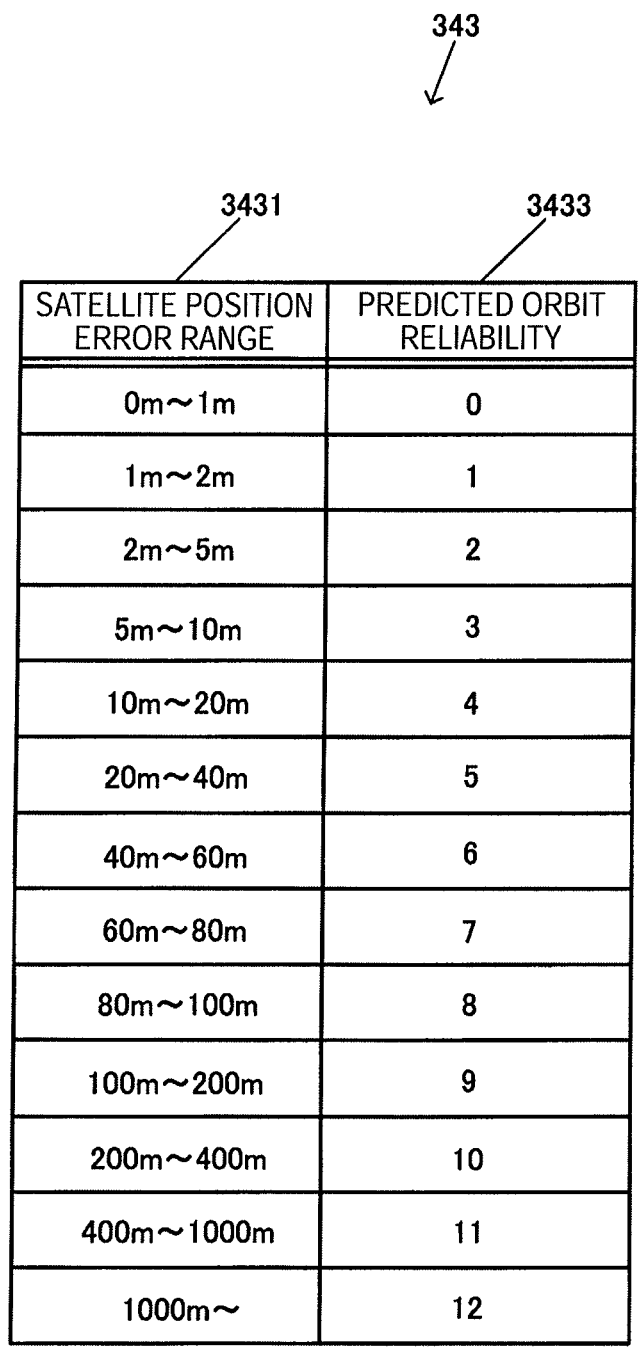
FIG. 6 is a diagram illustrating a data structure of predicted orbit reliability determining data.

FIG. 6 is a diagram illustrating the data structure of a predicted orbit reliability determining data 343.

Satellite position error ranges 3431, including the satellite position errors and predicted orbit reliabilities 3433 set when the satellite position errors belong to the satellite position error range 3431, are correlated and included in the predicted orbit reliability determining data 343.

For each satellite calendar combination including a predicted satellite calendar and a precise satellite calendar, the distances (inter-satellite-position distances) between the predicted positions and the actual positions at the times corresponding to the times of the predicted positions are calculated. The average of the calculated inter-satellite position distances is the satellite position error. The satellite position error is calculated for each satellite calendar combination.

The predicted orbit reliability 3433 is a kind of indicator value indicating the reliability of the predicted orbit as described in the principle and is expressed by 13 steps of "0" to "12", where "0" means the highest reliability of the predicted orbit and "12" means the lowest reliability of the predicted orbit. For example, when the satellite position error 3431 is included in the range of "20 m to 40 m", "5" is set as the predicted orbit reliability 3433.

Figure 5:
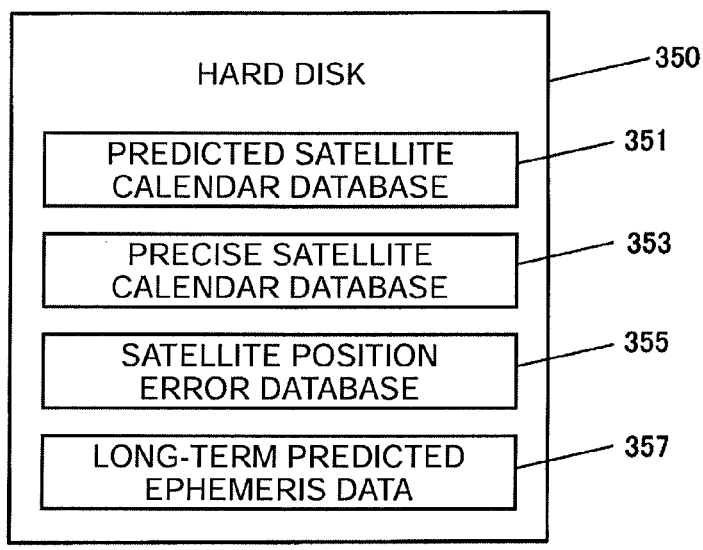
FIG. 5 is a diagram illustrating an example of data stored in a hard disk of the server system.

FIG. 5 is a diagram illustrating an example of data stored in the hard disk 350. The hard disk 350 stores a predicted satellite calendar database 351, a precise satellite calendar database 353, a satellite position error database 355, and a long-term predicted ephemeris data 357.

Figure 7:
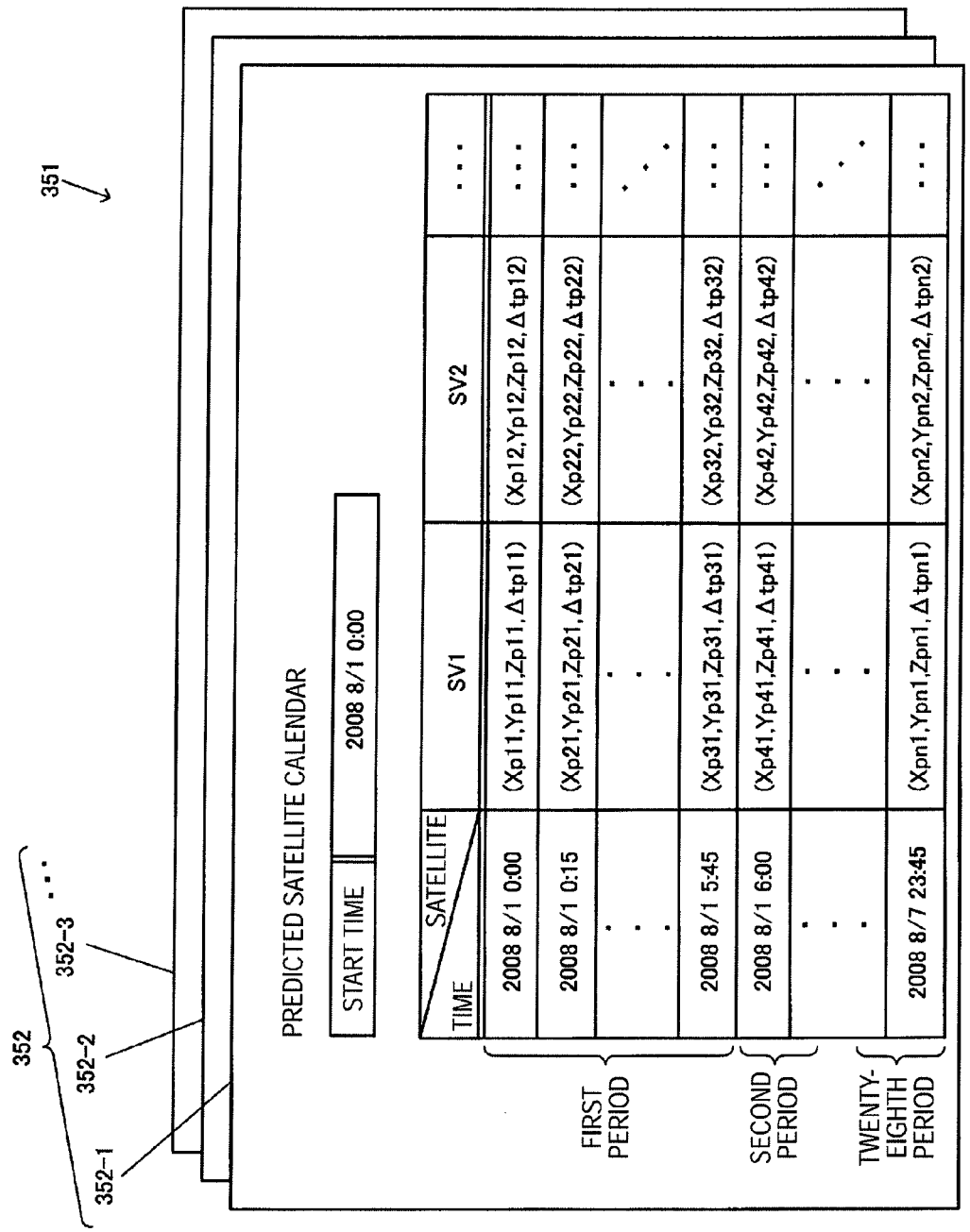
FIG. 7 is a diagram illustrating a data structure of a predicted satellite calendar database.

FIG. 7 is a diagram illustrating the data structure of the predicted satellite calendar database 351. The predicted satellite calendar database 351 includes plural predicted satellite calendars 352 (352-1, 352-2, 352-3, . . . ) in time series. The predicted satellite calendars 352 are discrete data in which the predicted positions and the predicted clock errors for one week of the GPS satellites SV are arranged with the interval of 15 minutes and data is collected every start time. For the purpose of convenience, 28 periods of a first period to a twenty-eighth period are constructed by dividing the period of one week into groups every 6 hours.

For example, the predicted satellite calendar 352-1 is data of which the prediction start time is "0:00 of Aug. 1, 2008". The predicted position of the GPS satellite "SV2" at 5:45 on Aug. 1, 2008", is "(Xp32, Yp32, Zp32)" and the prediction error of the atomic clock is "Δtp32".

The CPU 310 periodically (for example, every 4 hours) receives the predicted satellite calendars from the external system 2. Then, the CPU 310 performs a process of processing data format to store the received predicted satellite calendars in the predicted satellite calendar database 351. Specifically, plural predicted satellite calendars 352 including data having different start times and the same period as the creation period (for example, one week) of the long-term predicted ephemeris are created and stored in the predicted satellite calendar database 351.

Figure 8:
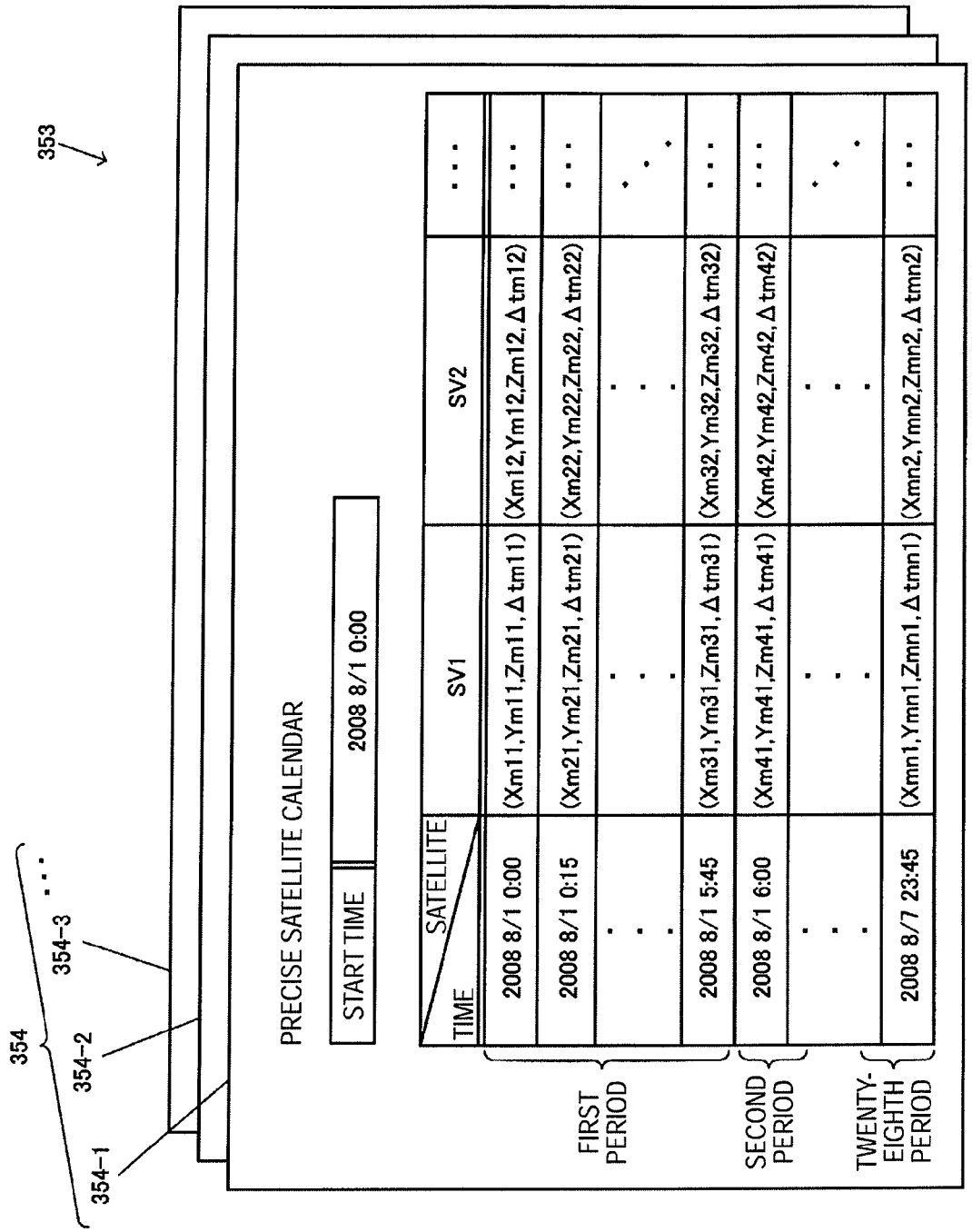
FIG. 8 is a diagram illustrating a data structure of a precise satellite calendar database.

FIG. 8 is a diagram illustrating the data structure of the precise satellite calendar database 353. The precise satellite calendar database 353 stores plural precise satellite calendars 354 (354-1, 354-2, 354-3, . . . ) in time series. The precise satellite calendars 354 have discrete data in which the actual positions of the GPS satellites SV corresponding to one week and actual clock errors with an interval of 15 minutes are stored and which data collected each start time. By dividing the period of one week into groups every 6 hours, 28 periods of the first to the twenty-eighth period are constructed.

For example, the precise satellite calendar 354-1 has data of which the measurement start time is "0:00 on Aug. 1, 2008". The actual position of the GPS satellite "SV2" at 5:45 on Aug. 1, 2008", is "(Xm32, Ym32, Zm32)" and the actual error of the atomic clock is "Δtm32"

The CPU 310 periodically (for example, every 4 hours) receives the precise satellite calendars from the external system 2. Then, the CPU 310 performs a process of processing a data format to store the received precise satellite calendars in the precise satellite calendar database 353. Specifically, plural precise satellite calendars 354 of which the start times correspond to the plural predicted satellite calendars 352 stored in the predicted satellite calendar database 351 are created and stored in the precise satellite calendar database 353.

Figure 9:
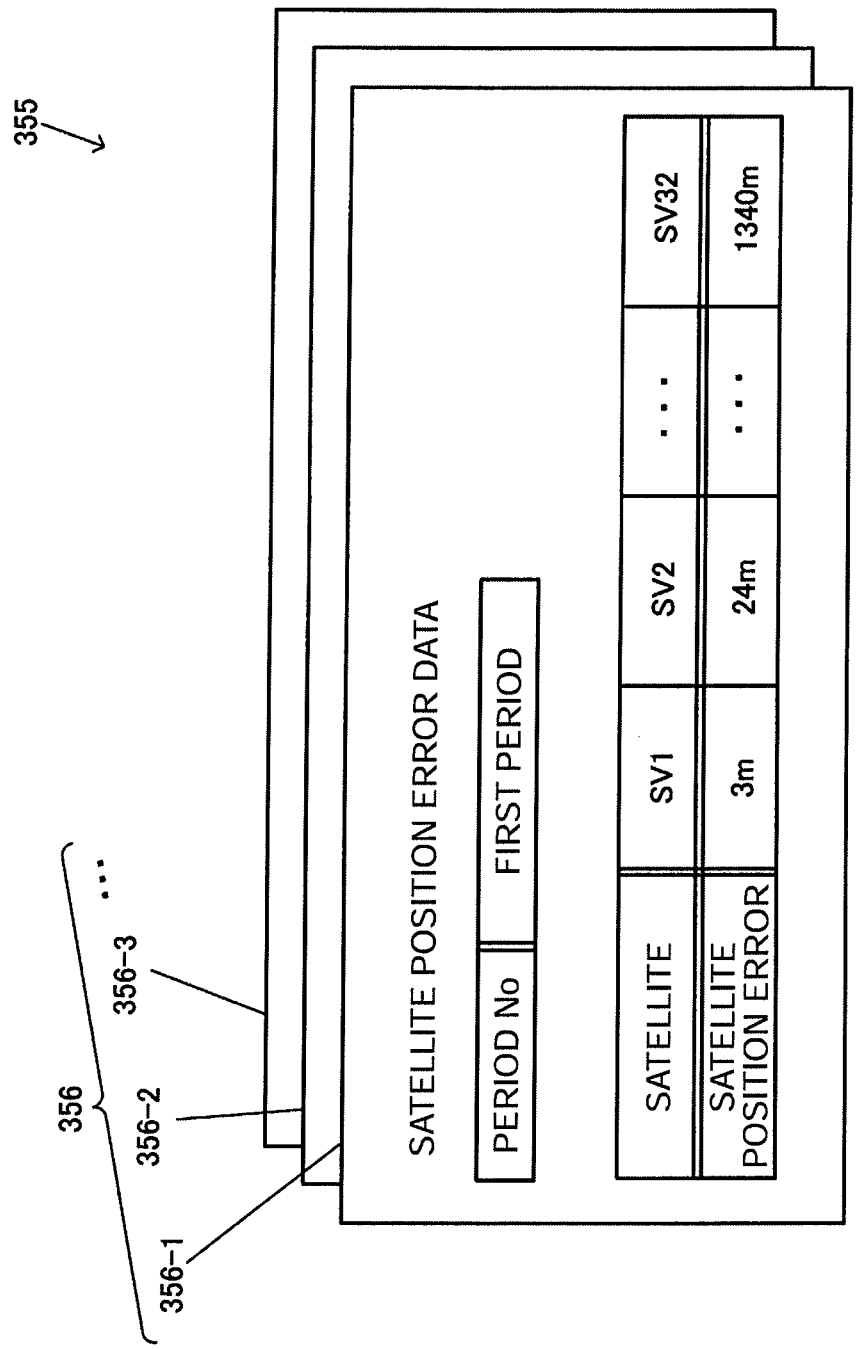
FIG. 9 is a diagram illustrating a data structure of a satellite position error database.

FIG. 9 is a diagram illustrating the data structure of the satellite position error database 355. The satellite position error database 355 stores plural satellite position error data pieces 356 (356-1, 356-2, 356-3, . . . ) by periods. Each satellite position error data piece 356 includes the number of the corresponding period and the satellite position error of the respective GPS satellites (SV1 to SV32) in the corresponding period, which are correlated with each other.

For example, the satellite position error data piece 356-1 is the data of the first period. The satellite position error of the GPS satellite "SV2" in the first period is "24 m". The CPU 310 calculates the satellite position errors of the GPS satellites SV in the periods using the predicted positions included in the predicted satellite calendars 352 and the actual positions included in the precise satellite calendars 354 in the periods corresponding to the predicted satellite calendars 352 in the long-term predicted ephemeris creating process. The CPU 310 creates the satellite position error data 356 including calculated satellite position errors and stores the created data in the satellite position error database 355.

Figure 10:
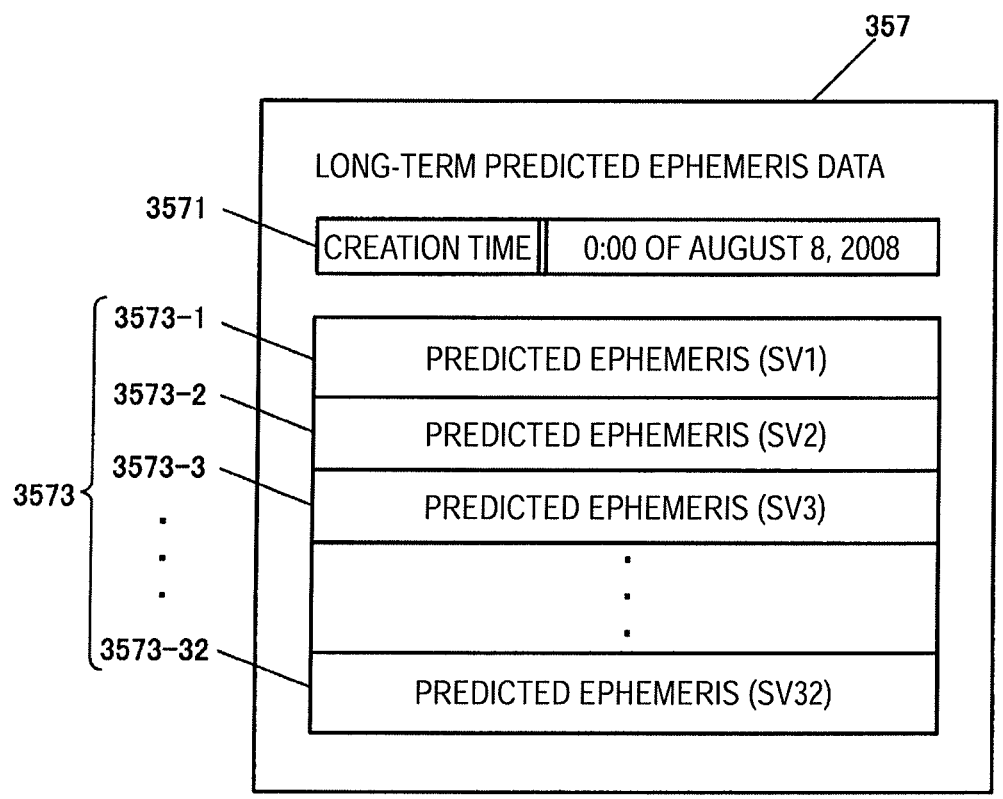
FIG. 10 is a diagram illustrating a data structure of a long-term predicted ephemeris data.

FIG. 10 is a diagram illustrating the data structure of the long-term predicted ephemeris data 357. The long-term predicted ephemeris data 357 includes the creation times 3571 of the long-term predicted ephemeris data and predicted ephemeris 3573 (3573-1 to 3573-32) of the GPS satellites SV1 to SV32 which are correlated with each other.

Figure 11:
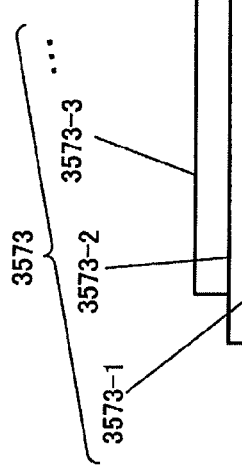
FIG. 11 is a diagram illustrating a data structure of a predicted ephemeris.

FIG. 11 is a diagram illustrating the data structure of the predicted ephemeris 3573. The predicted ephemeris 3573 (3573-1, 3573-2, . . . and 3573-32) includes values of Keppler's satellite orbit parameters such as the long orbit radius, the eccentricity, and the orbit inclination angle, values of clock correcting parameters such as reference times of satellite clocks, offsets of the satellite clocks, the drift of the satellite clock, and the drift of the satellite clock frequencies, and the predicted orbit reliabilities as the reliability parameter in the respective prediction periods.

In the long-term predicted ephemeris creating process, the CPU 310 calculates the values of the satellite orbit parameters, the clock correcting parameters, and the reliability parameter for each GPS satellite SV and creates the predicted ephemeris 3573 every prediction period. The predicted ephemeris 3573 created for all the GPS satellites SV is collected and correlated with the creation times 3571 to create and store the long-term predicted ephemeris data 357 in the hard disk 350.

1-4. Flow of Processes

Figure 12:
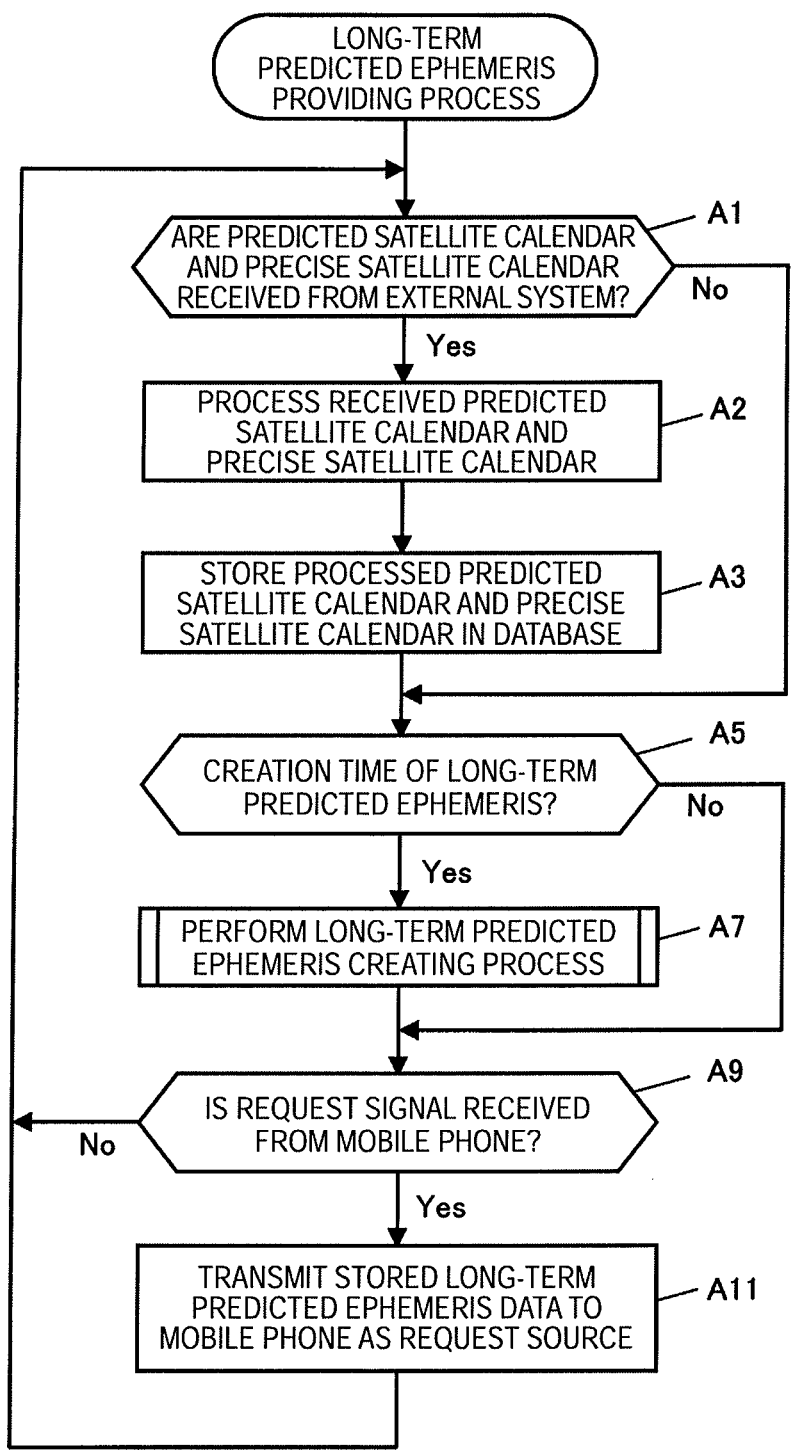
FIG. 12 is a flowchart illustrating a flow of a long-term predicted ephemeris providing process.

FIG. 12 is a flowchart illustrating a flow of the long-term predicted ephemeris providing process performed by the server system 3 by allowing the CPU 310 to read and execute the long-term predicted ephemeris providing program 341 stored in the ROM 340.

First, the CPU 310 determines whether the predicted satellite calendar and the precise satellite calendar are received from the external system 2 (step A1). When it is determined that they are not received (NO in step A1), the process of step A5 is performed.

When it is determined that they are received (YES in step A1), the CPU 310 processes the predicted satellite calendar and the precise satellite calendar and creates plural predicted satellite calendars 352 and precise satellite calendars 354 having the same start time and the same period (step A2). The CPU 310 stores the predicted satellite calendars 352 and the precise satellite calendars 354 in the predicted satellite calendar database 351 and the precise satellite calendar database 353 of the hard disk 350, respectively (step A3).

The CPU 310 determines whether the creation time of the long-term predicted ephemeris comes in (step A5). In this embodiment, it is assumed that the long-term predicted ephemeris is created once every 4 hours. When it is determined that the creation time does not come in yet (NO in step A5), the CPU 310 performs the process of step A9.

When it is determined that the creation time of the long-term predicted ephemeris comes in (YES in step A5), the CPU 310 performs the long-term predicted ephemeris creating process by reading and executing the long-term predicted ephemeris creating program 3411 stored in the ROM 340 (step A7).

Figure 13:
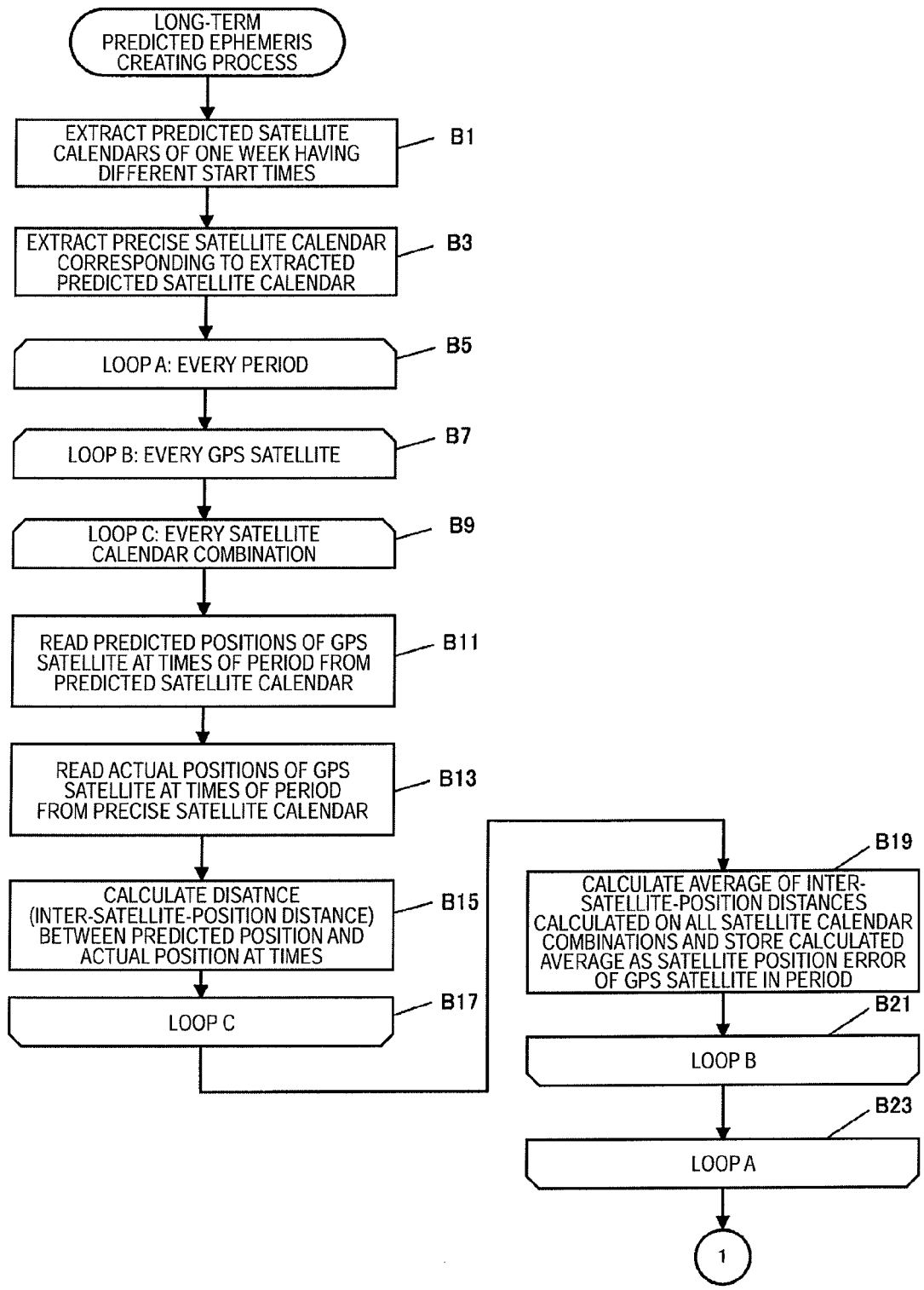
FIG. 13 is a flowchart illustrating a flow of a long-term predicted ephemeris creating process.
Figure 14:
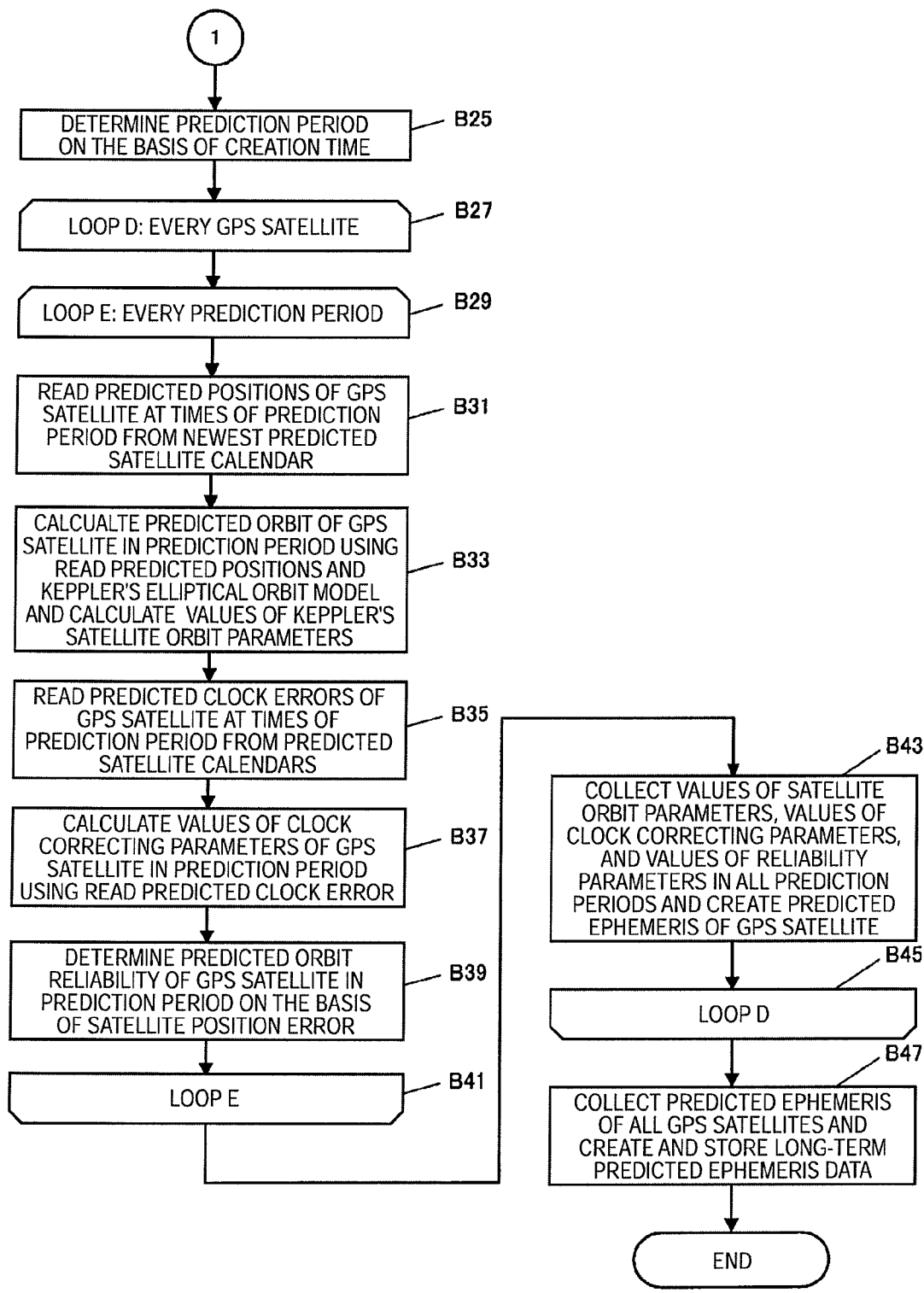
FIG. 14 is a flowchart illustrating a flow of the long-term predicted ephemeris creating process.

FIGS. 13 and 14 are flowcharts illustrating the flow of the long-term predicted ephemeris creating process.

First, the CPU 310 extracts the predicted satellite calendar 352 of one week having different start times from the predicted satellite calendar database 351 of the hard disk 350 (step B1). The precise satellite calendars 354 corresponding to the extracted predicted satellite calendars 352 (step B3).

Then, the CPU 310 performs the processes of loop A on the first to the twenty-eighth period (steps B5 to B23). In the processes of loop A, the processes of loop B are performed on the GPS satellites SV (steps B7 to B21). In the processes of loop B, the CPU 310 performs the processes of loop C on the satellite calendar combinations (steps B9 to B17).

In the processes of loop C, the CPU 310 reads the predicted positions of the GPS satellite at the times in the corresponding period from the corresponding predicted satellite calendar 352 (step B11). The CPU 310 reads the actual positions of the corresponding GPS satellite at the times of the corresponding period from the corresponding precise satellite calendar 354 (step B13).

Subsequently, the CPU 310 calculates the distances (inter-satellite-position distances) between the predicted positions read in step B11 and the actual positions read in step B13 at the times (step B15). The CPU 310 then processes the next satellite calendar combination.

The CPU 310 performs the processes of steps B11 to B15 on all the satellite calendar combinations and then ends the processes of loop C (step B17). Thereafter, the CPU 310 calculates the average of the inter-satellite-position distances calculated in step B15 for all the satellite calendar combinations, sets the calculated average as the satellite position error in the corresponding period of the corresponding GPS satellite, and stores the calculated average as the satellite position error data 356 in the satellite position error database 355 (step B19). Then, the CPU 310 performs the flow of processes on the next GPS satellite.

The CPU 310 performs the processes of steps B9 to B19 on all the GPS satellites and then ends the processes of loop B (step B21). The CPU 310 performs the processes of steps B7 to B21 on all the periods and then ends the processes of loop A (step B23).

Thereafter, the CPU 310 determines the prediction periods on the basis of the present creation time (current time) of the long-term predicted ephemeris (step B25). That is, the CPU 310 sets the period from the present creation time to the time after one week as the creation time and determines the periods into which the creation time is divided every 6 hours as the prediction periods.

Subsequently, the CPU 310 performs the processes of loop D on each of the GPS satellites SV (steps B27 to B45). In the processes of loop D, the CPU 310 performs the processes of loop E on each of the prediction periods determined in step B25 (steps B29 to B41).

In the processes of loop E, the CPU 310 reads the predicted positions of the corresponding GPS satellite SV at the times of the corresponding prediction period from the newest predicted satellite calendar 352 stored in the predicted satellite calendar database 351 of the hard disk 350 (step B31). The CPU 310 calculates the predicted orbit of the corresponding GPS satellite SV in the prediction period using the read predicted positions and Keppler's elliptical orbit model and acquires the values of Keppler's satellite orbit parameters (step B33). Since the specific method of calculating the predicted orbit is widely known, its detailed description will be omitted.

Thereafter, the CPU 310 reads the predicted clock error of the corresponding GPS satellite SV at the times of the corresponding prediction period from the newest predicted satellite calendar 352 (step B35). Then, the CPU 310 acquires the values of the clock correcting parameters of the GPS satellite in the corresponding prediction period using the read predicted clock error (step B37).

The predicted clock error "Δt" at the time "t" can be approximated by Expression 1 using the reference time "$t_c$" of the satellite clock, the offset "$a_0$" of the satellite clock, the drift "$a_1$" of the satellite clock, and the drift "$a_2$" of the satellite clock frequency, which are the clock correcting parameters.

$$\Delta t = a_0 + a_1(t-t_c) + a_2(t-t_c)^2 \qquad \text{Expression 1}$$

Expression 1 is a clock error model expression for approximating a temporal variation of the predicted clock error. By performing the approximating calculation, for example, by the use of the least square method using the predicted clock errors "Δt" at the times included in the predicted satellite calendar 352 as sampling data, the values of the clock correcting parameters can be calculated.

The CPU 310 determines the predicted orbit reliability in the corresponding prediction period of the corresponding GPS satellite on the basis of the satellite position errors included in the satellite position error data 356 stored in the satellite position error database 355 (step B39). Specifically, the CPU 310 determines the satellite position error range 3431 including the satellite position error with reference to the predicted orbit reliability determining data 343 stored in the ROM 340. Then, the CPU 310 determines the predicted orbit reliability 3433 corresponding to the determined satellite position error range 3431 as the predicted orbit reliability in the corresponding prediction period of the corresponding GPS satellite. Thereafter, the CPU 310 performs the flow of processes on the next prediction period.

The CPU 310 performs the processes of steps B31 to B39 on all the prediction periods and then ends the processes of loop E (step B41). Thereafter, the CPU 310 collects the values of the satellite orbit parameters calculated in step B33 for all the prediction periods, the values of the clock correcting parameters calculated in step B37, and the predicted orbit reliability as the value of the reliability parameter determined in step B39 and creates the predicted ephemeris 3573 of the corresponding GPS satellite SV (step B43). The CPU 310 performs the flow of processes on the next GPS satellite SV.

The CPU 310 performs the processes of steps B29 to B43 on all the GPS satellites SV and then ends the processes of loop D (step B45). Thereafter, the CPU 310 collects and correlates the predicted ephemeris 3573 of all the GPS satellites SV created in step B43 with the creation times 3571 to create the long-term predicted ephemeris data 357 and the created long-term predicted ephemeris data 357 is stored in the hard disk 350 (step B47). Then, the CPU 310 ends the long-term predicted ephemeris creating process.

Returing to the long-term predicted ephemeris providing process shown in FIG. 12 again, after performing the long-term predicted ephemeris creating process, the CPU 310 determines whether the request signal for the long-term predicted ephemeris data 357 is received from the mobile phone 4 (step A9). When it is determined that the request signal is not received (NO in step A9), the process of step A1 is performed again.

When it is determined that the request signal is received (YES in step A9), the CPU 310 transmits the long-term predicted ephemeris data 357 stored in the hard disk 350 to the mobile phone 4 as the request source (step A11). Then, the CPU 310 performs the process of step A1 again.

1-5. Operational Advantage

According to the first embodiment, the server system 3 of the positioning system 1 determines the reliability of the long-term predicted ephemeris, which is acquired by predicting the satellite orbit in the creation period of at least one day, using the predicted satellite calendar which is data of the predicted positions of the GPS satellite SV and the precise satellite calendar which is data of the actual positions of the GPS satellite SV corresponding to the predicted positions, both calendars being received from the external system 2. Then, the server system 3 provides the determination result of the reliability to the mobile phone 4 along with the long-term predicted ephemeris.

Specifically, the predicted positions included in the predicted satellite calendar for the 28 prediction periods, into which the creation period of the long-term predicted ephemeris are divided, are divided into time-series groups every 28 periods having the same length as the prediction periods. Similarly, the actual positions included in the precise satellite calendar are divided into groups of 28 periods. For each of the plural combinations of the predicted satellite calendar and the precise satellite calendar, the satellite position error in each period is calculated on the basis of the distances between the predicted positions and the actual positions. The value of the reliability parameter in each prediction period is determined so that the reliability of the predicted orbit decreases as the satellite position error increases.

The actual position of the GPS satellite SV is the actual position at which the GPS satellite SV is actually located at that time. Accordingly, as the distance between the predicted position and the actual position of the GPS satellite SV increases, the reliability of the predicted satellite orbit decreases. Therefore, by comparing the predicted satellite calendar with the precise satellite calendar, it is possible to accurately determine the reliability of the long-term predicted ephemeris and thus to provide a proper value of the reliability parameter to the mobile phone 4.

2. Second Embodiment 2-1. Data Structure

In a second embodiment of the invention, the ROM 340 stores a second long-term predicted ephemeris creating program as a sub routine of the long-term predicted ephemeris providing program 341 and a second predicted orbit reliability determining data 345 as data. The CPU 310 performs a second long-term predicted ephemeris creating process by reading and executing the second long-term predicted ephemeris creating program in the long-term predicted ephemeris providing process.

Figure 15:
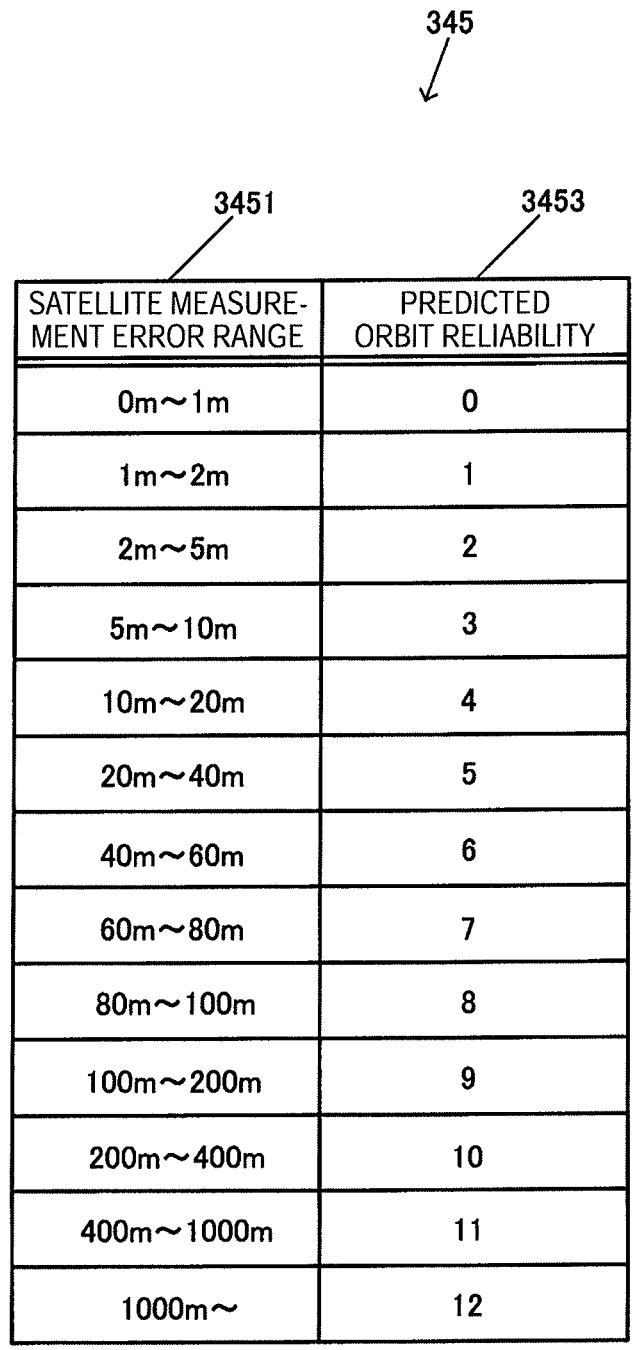
FIG. 15 is a diagram illustrating a data structure of second predicted orbit reliability determining data.

FIG. 15 is a diagram illustrating the data structure of the second predicted orbit reliability determining data 345. The second predicted orbit reliability determining data 345 correlates and includes a satellite measurement error range 3451 to which a satellite measurement error to be described later belongs and a predicted orbit reliability 3453 set when the satellite measurement error belongs to the satellite measurement error range 3451. Although the predicted orbit reliability is determined on the basis of the satellite position error in the first embodiment, the predicted orbit reliability is determined on the basis of the satellite measurement error in the second embodiment.

2-2. Flow of Processes

Figure 16:
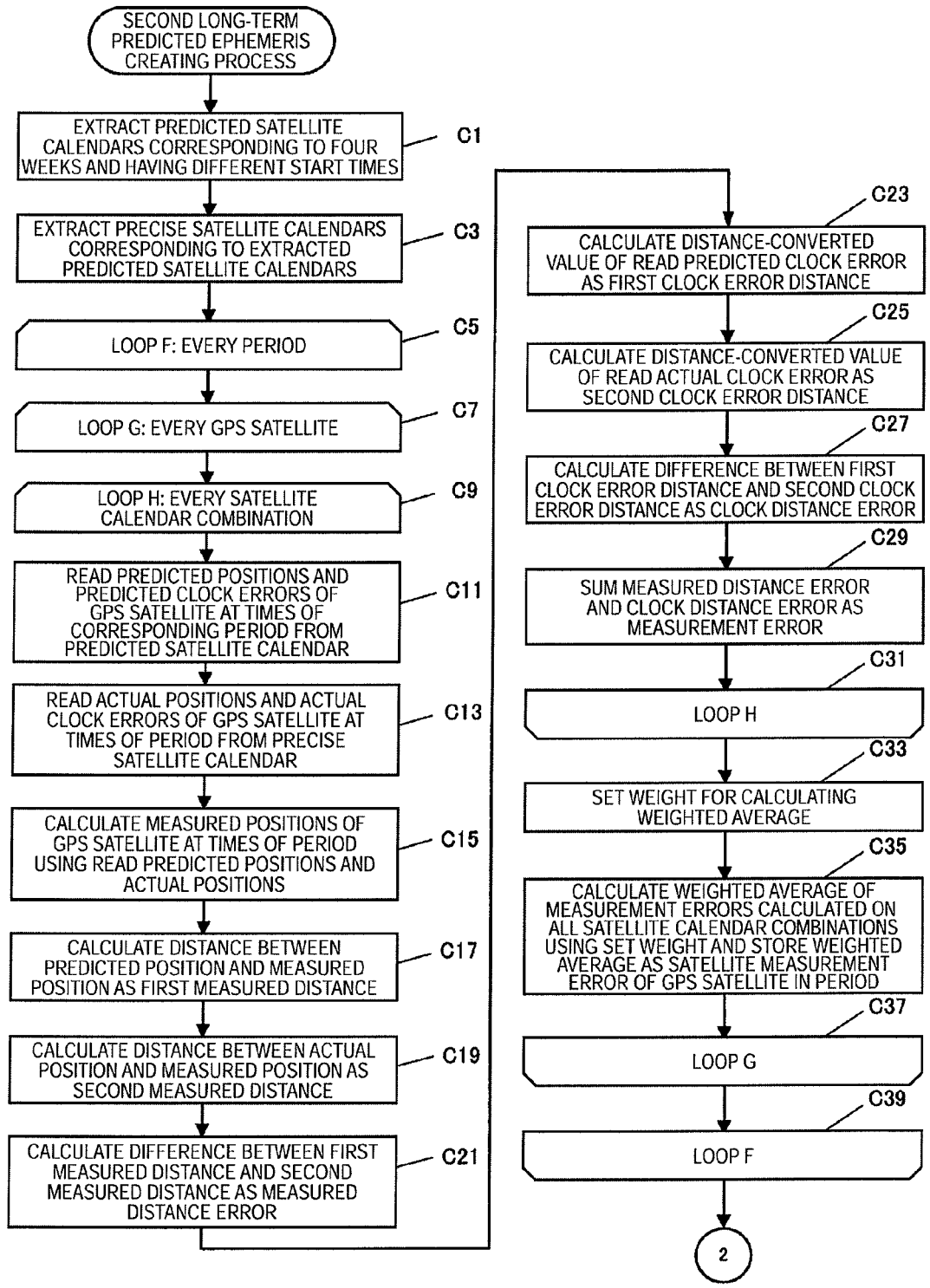
FIG. 16 is a flowchart illustrating a flow of a second long-term predicted ephemeris creating process.
Figure 17:
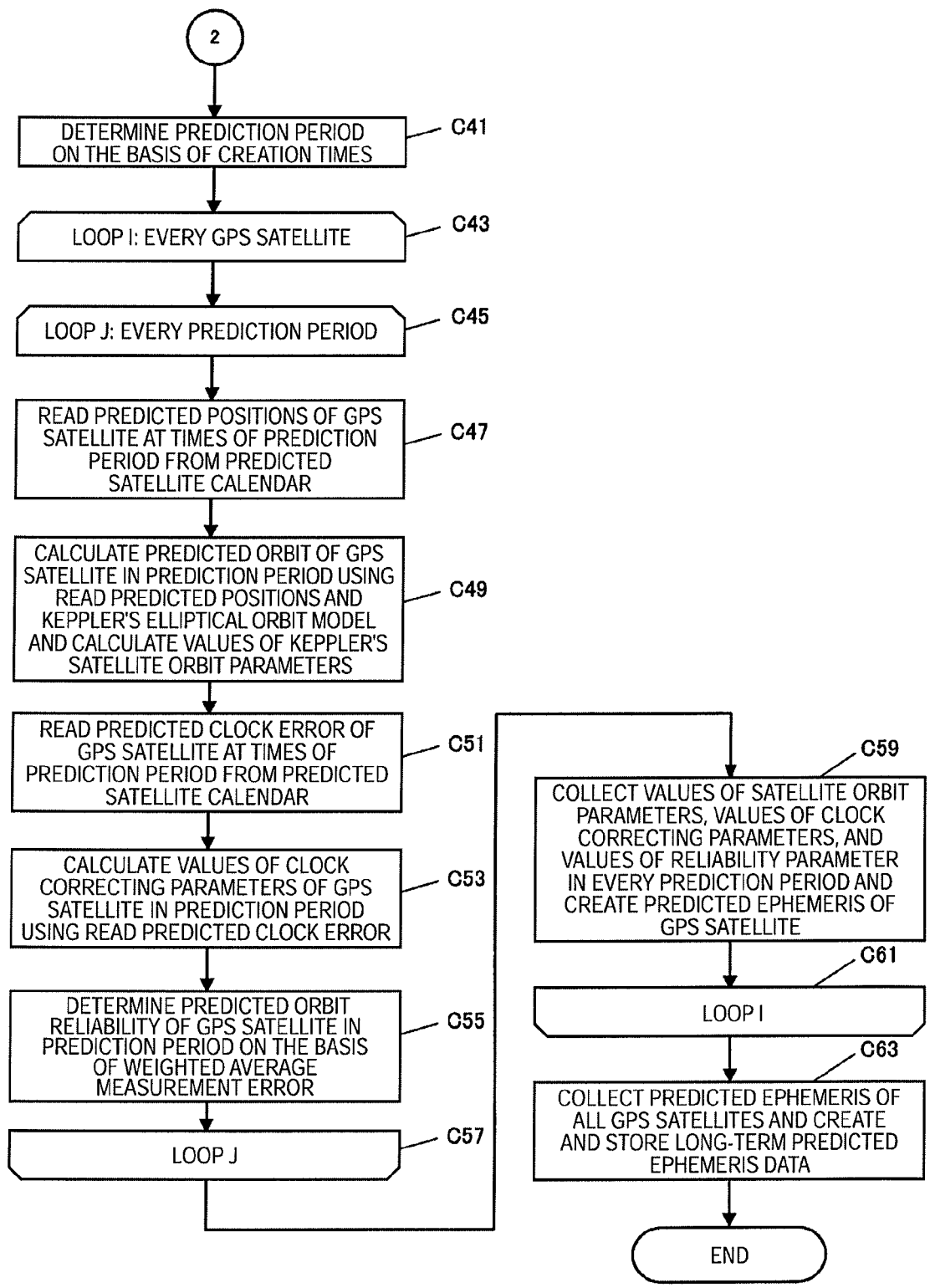
FIG. 17 is a flowchart illustrating a flow of the second long-term predicted ephemeris creating process.

FIGS. 16 and 17 are flowcharts illustrating the flow of the second long-term predicted ephemeris creating process.

First, the CPU 310 extracts the predicted satellite calendars 352 of four weeks having different start times from the predicted satellite calendar database 351 (step C1). In addition, the CPU 310 extracts the precise satellite calendars 354 corresponding to the predicted satellite calendars 352 extracted in step C1 from the precise satellite calendar database 353 (step C3).

Subsequently, the CPU 310 performs the processes of loop F on the first to twenty-eighth periods (steps C5 to C39). In the processes of loop F, the CPU 310 performs the processes of loop G on the GPS satellites (steps C7 to C37). In the processes of loop G, the CPU 310 performs the processes of loop H on the satellite calendar combinations (steps C9 to C31).

In the processes of loop H, the CPU 310 reads the predicted positions and the predicted clock errors at the times of the corresponding period for the corresponding GPS satellite from the corresponding predicted satellite calendar 352 (step C11). In addition, the CPU 310 reads the actual positions and the actual clock errors at the times of the corresponding period for the corresponding GPS satellite from the corresponding precise satellite calendar 354 (step C13).

The CPU 310 calculates the measured positions at the times of the corresponding period for the corresponding GPS satellite using the predicted positions and the actual positions read in steps C11 and C13 (step C15). The measured position is calculated as a middle position between the position obtained by projecting the predicted position onto the surface of the earth and the position obtained by projecting the actual position onto the surface of the earth. More specifically, the coordinate of the intersection at which a line connecting the predicted position to the center of the earth intersects the surface of the earth (with an elevation of 0 m) and the coordinate of the intersection at which a line connecting the actual position to the center of the earth intersects the surface of the earth (with an elevation of 0 m) are calculated. Then, a position indicated by the coordinate of the middle point between two intersections is set as the measured position. The measured positions are calculated using a so-called elevation projection method.

Thereafter, the CPU 310 calculates the distance between the predicted position and the measured position at each time and sets the calculated distance as a first measured distance (step C17). In addition, the CPU 310 calculates the distance between the actual position and the measured position at each time and sets the calculated distance as a second measured distance (step C19). Then, the CPU 310 calculates the difference between the first measured distance and the second measured distance at each time and sets the calculated difference as a measured distance error (step C21).

The CPU 310 calculates a distance-converted value of the predicted clock error read in step C11 at each time and sets the calculated distance-converted value as a first clock error distance (step C23). In addition, the CPU 310 calculates the distance-converted value of the actual clock error read in step C13 at each time and sets the calculated distance-converted value as a second clock error distance (step C25). The distance-converted value can be acquired by multiplying the clock error by the speed of light.

Thereafter, the CPU 310 calculates the difference between the first clock error distance calculated in step C23 and the second clock error distance calculated in step C25 at each time and sets the calculated difference as a clock distance error (step C27). The CPU 310 sums the measured distance error calculated in step C21 and the clock distance error calculated in step C27 at the times and sets the measurement error (step C29). Then, the CPU 310 processes the next satellite calendar combination.

Generally, at the time of measuring a position, the correct quasi-distance between the GPS satellite and the positioning device is calculated for use in the positioning calculation by adding the position error corresponding to the clock error of the GPS satellite. For this reason, in this embodiment, the measurement error is calculated by summing the measured distance error calculated by the difference between the first measured distance and the second measured distance and the clock distance error calculated by the difference between the first clock error distance and the second clock error distance and the predicted orbit reliability is determined using the calculated measurement error.

The CPU 310 performs the processes of steps C11 to C29 on all the satellite calendar combinations and then ends the processes of loop H (step C31). Thereafter, the CPU 310 sets the weight for calculating a weighted average of the measurement errors (step C33). Specifically, the weight is set to be smaller for the measurement error corresponding to the satellite calendar combination having the older start time.

The CPU 310 calculates the weighted average of the measurement errors calculated in step C29 using the weight set in step C33 for all the satellite calendar combinations and the weighted average is stored as the satellite measurement error in the corresponding period of the corresponding GPS satellite (step C35). More specifically, the CPU 310 calculates the satellite measurement error "Eo" using Expressions 2 and 3, where the weights used to calculate the weighted average are "$k_1$ to $k_N$" and the measurement errors are "$e_1$ to $e_N$"

$$Eo=(k_1/K) \times e_1+(k_2/K) \times e_2+ \ldots +(k_N/K) \times e_N \quad \text{Expression 2}$$

$$K=k_1+k_2+ \ldots +k_N \quad \text{Expression 3}$$

Here, "N" represents the number of satellite calendar combinations.

Thereafter, the CPU 310 processes the next GPS satellite. The CPU 310 performs the processes of steps C9 to C35 on all the GPS satellites and then ends the processes of loop G (step C37). The CPU 310 performs the processes of steps C7 to C37 on all the periods and then ends the processes of loop F (step C39).

Subsequently, the CPU 310 performs the processes of steps C41 to C63. These processes are substantially equal to the processes of steps B25 to B47 in the long-term predicted ephemeris creating process shown in FIG. 14. They are different from each other, in that the predicted orbit reliability in the corresponding prediction period for the corresponding GPS satellite is determined in step C55 on the basis of the satellite measurement error calculated in step C35.

Specifically, the CPU 310 determines the satellite measurement error range 3451 including the satellite measurement error calculated in step C35 with reference to the second predicted orbit reliability determining data 345 stored in the ROM 340. Then, the CPU 310 reads the predicted orbit reliability 3453 corresponding to the determined satellite measurement error range 3451 and determines the read predicted orbit reliability as the predicted orbit reliability in the corresponding prediction period for the corresponding GPS satellite.

2-3. Operational Advantage

According to the second embodiment of the invention, the server system 3 calculates a first distance by adding the measured distance error corresponding to the predicted clock error of the GPS satellite SV at a predicted position to the distance from the measured position to the predicted position in each period of the plural combinations of the predicted satellite calendar and the precise satellite calendar. The server system 3 also calculates a second distance by adding the measured distance error corresponding to the actual clock error of the GPS satellite SV at an actual position to the distance from the measured position to the actual position. Subsequently, the server system 3 calculates the difference (measured distance error) between the first distance and the second distance. Then, the server system 3 calculates the weighted average of the measured distance errors to acquire the satellite measurement error and determines the predicted orbit reliability in the prediction periods using the acquired satellite measurement error in each period.

As the measured distance error is calculated on the satellite calendar combination having a start time closer to the creation time of the long-term predicted ephemeris, the measured distance error has a higher possibility of accurate reproduction. Therefore, the weighted average of the measured distance errors are calculated by setting the weight thereof to be higher as the start time is closer to the creation time of the long-term predicted ephemeris and setting the weight thereof to be lower as the start time is older. Accordingly, it is possible to accurately determine the reliability of the predicted orbit and to provide the proper value of the reliability parameter to the mobile phone 4.

3. Modified Example 3-1. Positioning System

Although the positioning system 1 including the server system 3 and the mobile phone 4 has been exemplified in the above-mentioned embodiments, the invention is not limited to the positioning system. For example, the invention may be applied to electronic apparatuses such as a notebook computer, a PDA (Personal Digital Assistant), and a car navigation apparatus having a positioning device, instead of the mobile phone 4.

Although the server system 3 has been exemplified as a kind of information providing apparatus in the above-mentioned embodiments, the information providing apparatus is not limited to the server system 3. For example, a general-purpose PC and the like may be employed.

3-2. Satellite Positioning System

Although the GPS has been exemplified as the satellite positioning system in the above-mentioned embodiments, other satellite positioning systems such as WAAS (Wide Area Augmentation System), QZSS (Quasi Zenith Satellite System), GLONASS (GLObal NAvigation Satellite System), and GALILEO may be employed.

3-3. Satellite Position Error

Although it has been described in the first embodiment that the average value of the inter-satellite-position distances calculated on all the satellite calendar combinations is calculated and set as the satellite position error in each period, the satellite position error may be calculated as follows. That is, the maximum value of the inter-satellite-position distances calculated on all the satellite calendar combinations may be determined as the satellite position error. In this case, by detecting a case where the inter-satellite-position distance in a certain period is extremely great (the satellite position error is extremely great), it is possible to set a proper predicted orbit reliability.

The satellite position errors of the periods may be calculated using Expression 4.

$$Ep = d_{AVE} + R \cdot (d_{MAX} - d_{AVE})$$  Expression 4

Here, "Ep" represents the satellite position error, "$d_{AVE}$" represents the average value of the inter-satellite-position distances, $d_{MAX}$, represents the maximum value of the inter-satellite-position distances, and "R" represents a ratio at which the inter-satellite-position distance is two times or more the average of the inter-satellite-position distances of all the GPS satellites in the corresponding period. In this case, since the satellite position error becomes greater when a larger number of inter-satellite-position distances are extremely great, the predicted orbit reliability thereof is determined to be lower.

Additionally, the satellite position error may be calculated using the position acquired by adding the position error corresponding to the clock error to the satellite position. Specifically, the predicted position and the predicted clock error included in the predicted satellite calendar are read in the respective periods and the position acquired by adding the position error corresponding to the predicted clock error to the predicted position is calculated as a first satellite position. Similarly, the actual position and the actual clock error included in the precise satellite calendar are read and the position acquired by adding the position error corresponding to the actual clock error to the actual position is calculated as a second satellite position. The distance between the first satellite position and the second satellite position is set as the inter-satellite-position distance and the satellite position error is calculated by calculating the average of the inter-satellite-position distances every period.

3-4. Satellite Measurement Error

Although it has been described in the second embodiment that the satellite measurement error is calculated by calculating the weighted average of the measurement errors calculated on the periods, the satellite measurement error may be calculated as follows. That is, the standard deviation (σ) of the measurement errors calculated on the periods is calculated and the average or maximum value of the measurement errors belonging to the confidence interval (1σ) apart by the standard deviation from the average of the measurement errors is calculated. The calculated average or maximum value is set as the satellite measurement error in the corresponding period.

In this case, the great measurement error not belonging to the confidence interval of 1σ is neglected and the satellite measurement error is calculated on the basis of the magnitude of the measurement errors belonging to the range in which most of the measurement errors are distributed. Accordingly, it is possible to properly determine the reliability of the predicted orbit in consideration of the average and the deviation of the measurement errors.

3-5. Creation of Long-Term Predicted Ephemeris

Although it has been described in the above-mentioned embodiments that the server system 3 creates and provides the long-term predicted ephemeris data to the mobile phone 4, the mobile phone 4 itself may create the long-term predicted ephemeris data. That is, the mobile phone 4 periodically acquires the predicted satellite calendars and the precise satellite calendars from the external system 2 and creates the long-term predicted ephemeris data by performing the long-term predicted ephemeris creating process using the acquired predicted satellite calendars and the acquired precise satellite calendars. The same is true when electronic apparatuses such as a notebook computer, a PDA, and a car navigation apparatus having a positioning device are employed instead of the mobile phone 4.

In the above-mentioned embodiments, it has been described that the server system 3 creates the long-term predicted ephemeris data at a predetermined time interval (for example, once every four hours) in advance and transmits the created long-term predicted ephemeris data when receiving a request for the long-term predicted ephemeris data from the mobile phone 4. However, instead of this configuration, when receiving the request for the long-term predicted ephemeris data from the mobile phone 4, the server system 3 may create and transmit the long-term predicted ephemeris data to the mobile phone 4.

3-6. Creation Period

Although it has been described in the above-mentioned embodiments that the long-term predicted ephemeris is created using the period of one week from the creation time of the long-term predicted ephemeris as the creation period, the creation period may be a period (for example, two weeks) longer than one week or may be a period (for example, three days) shorter than one week. The ephemeris as the navigation data transmitted from the GPS satellite SV generally has an availability period of about 4 hours, but the long-term predicted ephemeris has an availability period longer than that of the ephemeris as the navigation data transmitted from the GPS satellite SV. For example, it is preferable that the available period is one day or more.

3-7. Prediction Period

Although it has been described in the above-mentioned embodiments that the length of the prediction period is 6 hours, the length of the prediction period is not limited to it, but may be properly set to, for example, 4 hours or 8 hours.

3-8. Extraction of Satellite Calendar Combination

Although it has been described in the first embodiment that the satellite calendar combinations (the predicted satellite calendars and the precise satellite calendars) corresponding to one week and having different start times are extracted to calculate the satellite position error, the satellite calendar combinations to be extracted are not limited to those corresponding to one week, but may correspond to a period (for example, two weeks) longer than one week or a period (for example, five days) shorter than one week.

It has been described in the second embodiment that the satellite calendar combinations corresponding to four weeks and having different start times are extracted to calculate the satellite measurement error. Similarly, however, the satellite calendar combinations corresponding to a period (for example, 8 weeks) longer than four weeks or a period (for example, 2 weeks) shorter than four weeks may be extracted.

What is claimed is:

1. A method for providing a reliability data of a long-term predicted orbit data of a positioning satellite, comprising:
   acquiring an actual position data of the positioning satellite from an external source, the actual position data indicating a position where the positioning satellite is actually at a given time;
   determining the reliability data of the long-term predicted orbit data of the satellite by comparing a predicted position data with the actual position data, the predicted position data being derived from the long-term predicted orbit data of the positioning satellite and indicating a position where the positioning satellite is predicted to be at the given time; and
   providing the reliability data of the long-term predicted orbit data to a processor of a terminal device;
   determining a current position of the terminal device; and
   notifying a user of the terminal device the current position.

2. The method according to claim 1, wherein
   the long-term predicted orbit data of the positioning satellite is comprised of a plurality of data blocks each having a predetermined valid time duration and the valid time duration of at least one of the data blocks includes the period of past time.

3. The method according to claim 2, wherein
   the determining the reliability data of the long-term predicted orbit data of the positioning satellite includes determining the reliability data of the at least one of the plurality of data blocks using the actual position data and the predicted position data.

4. The method according to claim 1, wherein
   the comparing the predicted position data with the actual position data is performed based on an error range between the actual position data and the predicted position data corresponding to the period of past time.

5. The method according to claim 4, wherein
   the error range is calculated using at least one of a relative position between the actual position data and the predicted position data, a relative distance from the current position to each of the actual position data and the predicted position data, and difference of clock correcting parameter between the actual position data and the predicted position data.

6. The method according to claim 4, wherein
   the comparing a predicted position data with the actual position data is performed by averaging a plurality of the error ranges calculated from a plurality of the actual position data and a phurality of the predicted position data corresponding to the period of past time.

7. An apparatus that determines reliability of long-term predicted orbit data, comprising:
   a communication unit being configured to acquire an actual position data of the positioning satellite corresponding to a period of past time from an external source, the actual position data indicating a position where the positioning satellite is actually at a given time; and
   a processing unit being configured to determine the reliability data of the long-term predicted orbit data of the satellite by comparing a predicted position data with the actual position data, the predicted position data being derived from the long-term predicted orbit data of the positioning satellite and indicating a position where the positioning satellite is predicted to be at the given time,
   the communication unit being configured to provide the reliability data of the long-term predicted orbit data to a processor of a terminal device to determine a current position of the terminal device.

8. A non-transitory computer readable medium storing a computer program for providing a reliability data of a long-term predicted orbit data of a positioning satellite, comprising:
   code for acquiring an actual position data of the positioning satellite from an external source, the actual position data indicating a position where the positioning satellite is actually at given time;
   code for determining the reliability data of the long-term predicted orbit data of the satellite by comparing a predicted position data with the actual position data, the predicted position data being derived from the long-term predicted orbit data of the positioning satellite and indicating a position where the positioning satellite is predicted to be at the given time;
   code for providing the reliability data of the long-term predicted orbit data to a processor of a terminal device;
   code for determining a current position of the terminal device; and
   code for notifying a user of the terminal device the current position.

* * * * *